(12) United States Patent
Yuan et al.

(10) Patent No.: US 12,021,581 B2
(45) Date of Patent: Jun. 25, 2024

(54) ENABLING NON-COHERENT JOINT TRANSMISSION

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Xiaoxia Zhang, San Diego, CA (US); Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/758,105

(22) PCT Filed: Feb. 17, 2021

(86) PCT No.: PCT/CN2021/076665
§ 371 (c)(1),
(2) Date: Jun. 28, 2022

(87) PCT Pub. No.: WO2021/164693
PCT Pub. Date: Aug. 26, 2021

(65) Prior Publication Data
US 2023/0025805 A1    Jan. 26, 2023

(30) Foreign Application Priority Data

Feb. 21, 2020    (WO) ................ PCT/CN2020/076181

(51) Int. Cl.
*H04B 7/04*    (2017.01)
*H04B 7/0404*    (2017.01)
(Continued)

(52) U.S. Cl.
CPC ......... *H04B 7/0404* (2013.01); *H04B 7/0456* (2013.01); *H04B 7/063* (2013.01); *H04B 7/0634* (2013.01); *H04B 7/0639* (2013.01)

(58) Field of Classification Search
CPC .... H04B 7/0404; H04B 7/0456; H04B 7/063; H04B 7/0634; H04B 7/0639
See application file for complete search history.

(56) References Cited

U.S. PATENT DOCUMENTS

2012/0275414 A1* 11/2012 Hu ................. H04B 7/0452
370/329
2015/0263796 A1*  9/2015 Nam ............... H04L 5/0094
370/329

(Continued)

FOREIGN PATENT DOCUMENTS

CN    103560870 A    2/2014
CN    107888250 A    4/2018

(Continued)

OTHER PUBLICATIONS

Huawei, et al., "Maintenance for Multi-antenna Scheme," 3GPP TSG RAN WG1 Meeting #94bis, R1-1810705, Oct. 8-12, 2018 (Oct. 12, 2018) the whole document, 8 pages.

(Continued)

*Primary Examiner* — Freshteh N Aghdam
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information that indicates a transmit precoding matrix indicator, that identifies a precoding matrix, and a set of demodulation reference signal (DMRS) antenna ports. A first association may be between a first set of antenna indices of the precoding matrix, that form a first transmission group, and a first code-division multiplexing (CDM) group of the set of DMRS antenna (Continued)

600 ⟶

610 — Receive DCI that indicates a TPMI, that identifies a precoding matrix, and a set of DMRS antenna ports, where a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports 620 — Transmit an uplink transmission according to the first association and the second association ports, and a second association may be between a second set of antenna indices of the precoding matrix, that form a second transmission group, and a second CDM group of the set of DMRS antenna ports. The UE may transmit an uplink transmission according to the first association and the second association. Numerous other aspects are provided.

30 Claims, 11 Drawing Sheets

(51) Int. Cl.
*H04B 7/0456* (2017.01)
*H04B 7/06* (2006.01)

(56) References Cited

U.S. PATENT DOCUMENTS

| | | | |
|---|---|---|---|
| 2020/0106566 A1* | 4/2020 | Yeo | H04W 28/04 |
| 2020/0107353 A1* | 4/2020 | Jung | H04B 7/0689 |
| 2020/0146034 A1* | 5/2020 | Bagheri | H04W 72/1268 |
| 2020/0287602 A1* | 9/2020 | Park | H04W 72/23 |

FOREIGN PATENT DOCUMENTS

| | | |
|---|---|---|
| CN | 109842469 A | 6/2019 |
| CN | 110535589 A | 12/2019 |
| EP | 3860021 A1 | 8/2021 |
| WO | WO-2019130847 A1 | 7/2019 |

OTHER PUBLICATIONS

International Search Report and Written Opinion—PCT/CN2021/076665—ISA/EPO—May 14, 2021.
International Search Report and Written Opinion—PCT/CN2020/076181—ISA/EPO—Nov. 26, 2020.
Supplementary European Search Report—EP21757843—Search Authority—MUNICH—Mar. 19, 2024.

* cited by examiner

US 12,021,581 B2

ENABLING NON-COHERENT JOINT TRANSMISSION

CROSS-REFERENCE TO RELATED APPLICATIONS

This Patent Application is a 371 national stage of PCT Application No. PCT/CN2021/076665 filed on Feb. 17, 2021, entitled "ENABLING NON-COHERENT JOINT TRANSMISSION," which claims priority to Patent Cooperation Treaty (PCT) Patent Application No. PCT/CN2020/076181, filed on Feb. 21, 2020, entitled "ENABLING NON-COHERENT JOINT TRANSMISSION," and assigned to the assignee hereof. The disclosure of the prior is Applications are considered part of and is are incorporated by reference into this Patent Application.

FIELD OF THE DISCLOSURE

Aspects of the present disclosure generally relate to wireless communication and to techniques and apparatuses for enabling non-coherent joint transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory, the memory and the one or more processors configured to: receive downlink control information that indicates a transmit precoding matrix indicator, that identifies a precoding matrix, and a set of demodulation reference signal (DMRS) antenna ports, wherein a first association is between a first set of antenna indices of the precoding matrix, that form a first transmission group, and a first code-division multiplexing (CDM) group of the set of DMRS antenna ports, and a second association is between a second set of antenna indices of the precoding matrix, that form a second transmission group, and a second CDM group of the set of DMRS antenna ports; and transmit an uplink transmission according to the first association and the second association.

In some aspects, a base station for wireless communication includes a memory and one or more processors operatively coupled to the memory, the memory and the one or more processors configured to: transmit downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and receive an uplink transmission according to the first association and the second association.

In some aspects, a method of wireless communication performed by a UE includes receiving downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and transmitting an uplink transmission according to the first association and the second association.

In some aspects, a method of wireless communication performed by a base station includes transmitting downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and receiving an uplink transmission according to the first association and the second association.

In some aspects, a non-transitory computer-readable medium storing a set of instructions for wireless communication includes one or more instructions that, when executed by one or more processors of a UE, cause the UE to: receive downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and transmit an uplink transmission according to the first association and the second association.

In some aspects, a non-transitory computer-readable medium storing a set of instructions for wireless communication includes one or more instructions that, when executed by one or more processors of a base station, cause the base station to: transmit downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and receive an uplink transmission according to the first association and the second association.

In some aspects, an apparatus for wireless communication includes means for receiving downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and means for transmitting an uplink transmission according to the first association and the second association.

In some aspects, an apparatus for wireless communication includes means for transmitting downlink control information that indicates a transmit precoding matrix indicator, that identifies a precoding matrix, and a set of DMRS antenna ports, wherein a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports; and means for receiving an uplink transmission according to the first association and the second association.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
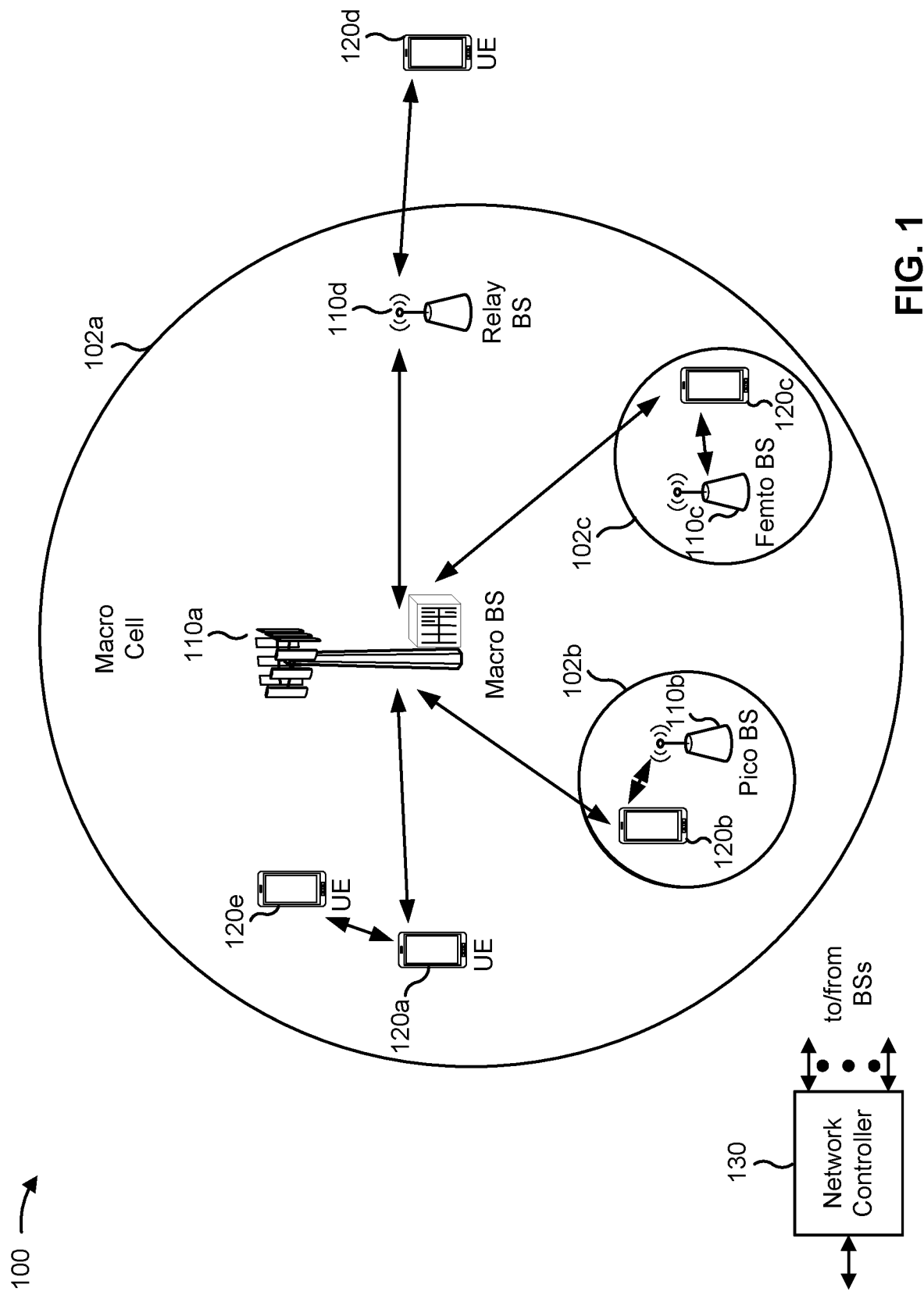
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
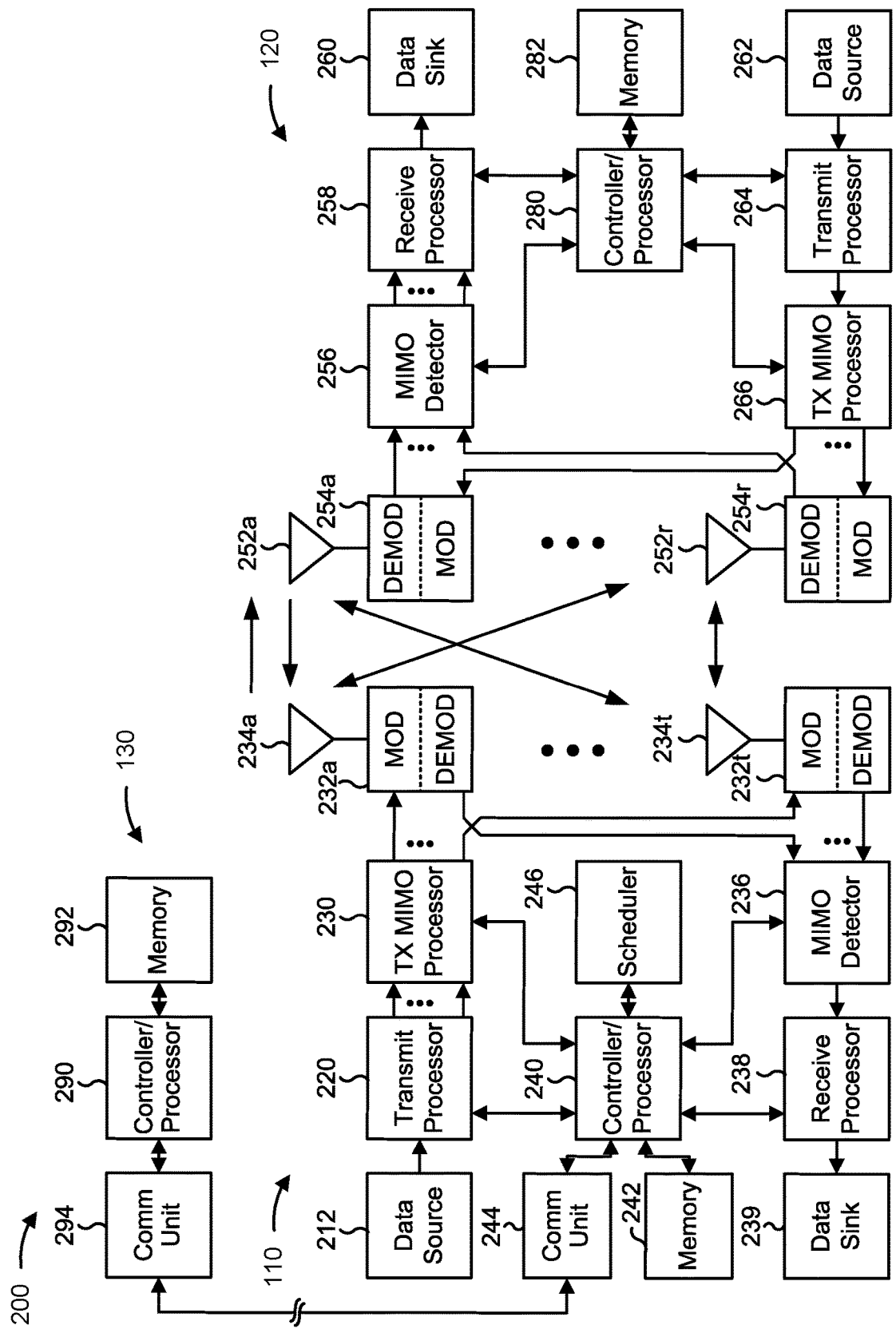
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with enabling non-coherent joint transmission, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for receiving downlink control information (DCI) that indicates a transmit precoding matrix indicator (TPMI), that identifies a precoding matrix, and a set of demodulation reference signal (DMRS) antenna ports, where a first association is between a first set of antenna indices of the precoding matrix, that form a first transmission group, and a first code-division multiplexing (CDM) group of the set of DMRS antenna ports, and a second association is between a second set of antenna indices of the precoding matrix, that form a second transmission group, and a second CDM group of the set of DMRS antenna ports, and/or means for transmitting an uplink transmission according to the first association and the second association. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting DCI that indicates a TPMI, that identifies a precoding matrix, and a set of DMRS antenna ports, where a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports, and/or means for receiving an uplink transmission according to the first association and the second association. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may transmit an uplink transmission using a beam that is generated using a precoding matrix. In some cases, the precoding matrix may be configured for a single-panel uplink transmission (such a precoding matrix may be referred to as a legacy precoding matrix). Accordingly, the precoding matrix may not be suitable for a multi-panel uplink transmission, such as a non-coherent joint transmission.

For example, according to legacy procedures, layers of the precoding matrix may be mapped to DMRS antenna ports of a first CDM group (transmitted using a first antenna panel) before being mapped to DMRS antenna ports of a second CDM group (transmitted using a second antenna panel). As a result, DMRS ports of a CDM group may be mapped to layers that are to be transmitted using antennas of different transmission groups, such that the precoding matrix may not be used for a multi-panel transmission. Moreover, this mapping may associate antennas of the same transmission group with different phase tracking reference signal (PTRS) antenna ports, thereby impairing utilization of a PTRS.

Some techniques and apparatuses described herein enable mapping of DMRS antenna ports of a first CDM group to one or more first layers of a precoding matrix that are to be transmitted using a first transmission group, and DMRS antenna ports of a second CDM group to one or more second layers of the precoding matrix that are to be transmitted using a second transmission group. In this way, the first transmission group and the first CDM group may be associated with a first antenna panel, and the second transmission group and the second CDM group may be associated with a second antenna panel, thereby enabling a non-coherent joint transmission.

Figure 3:
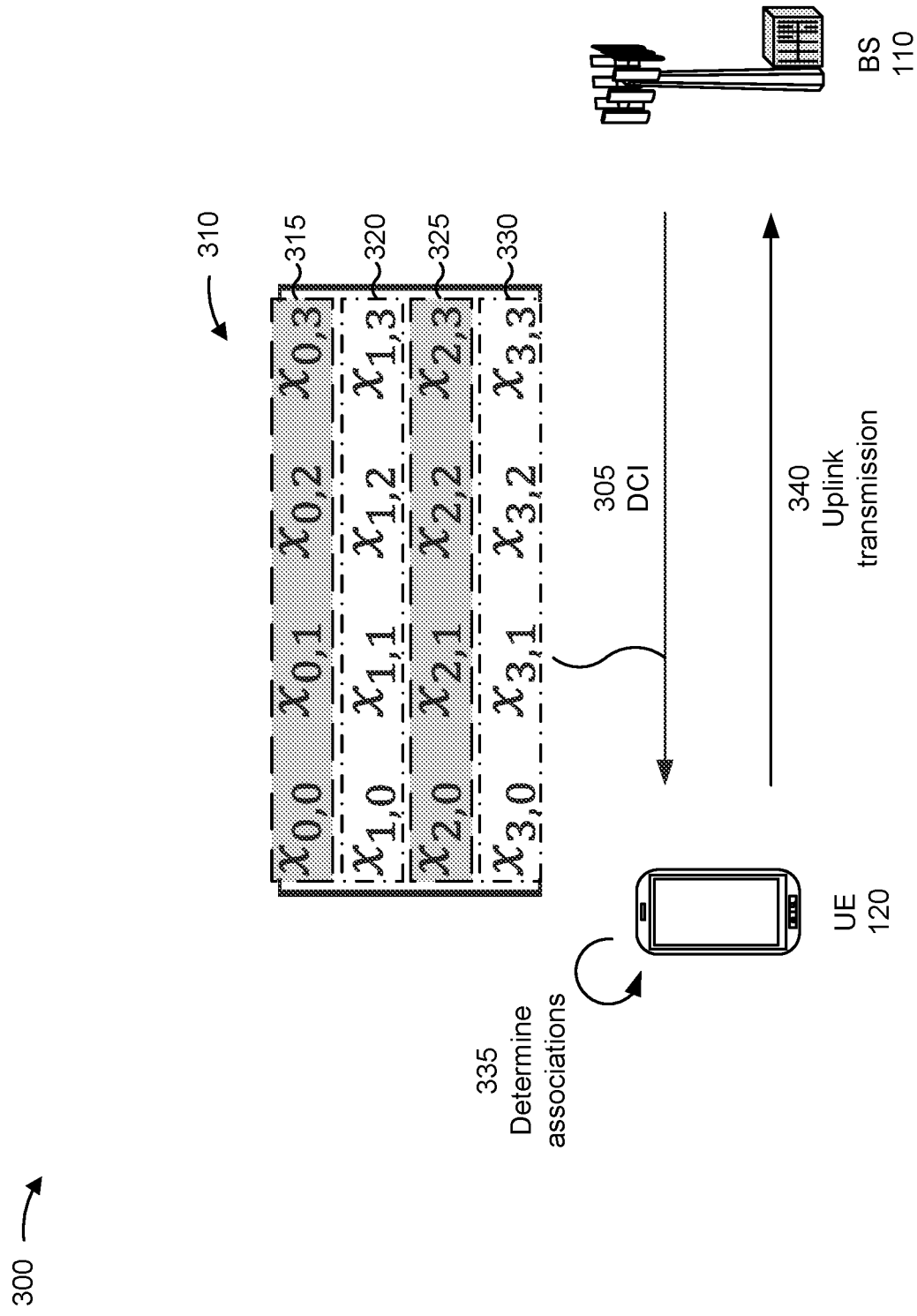
FIGS. 3-5 are diagrams illustrating examples of enabling non-coherent joint transmission, in accordance with the present disclosure.

FIG. 3 is a diagram illustrating an example 300 of enabling non-coherent joint transmission, in accordance with the present disclosure. As shown in FIG. 3, a UE 120 and a BS 110 may communicate in connection with an uplink transmission. In some aspects, the uplink transmission may use multiple antenna panels of the UE 120. For example, the uplink transmission may be a non-coherent joint transmission (e.g., a multiple layer transmission in which each layer is transmitted using a respective antenna panel (i.e., a respective beam)).

As shown by reference number 305, the BS 110 may transmit, and the UE 120 may receive, DCI. The DCI may provide an uplink grant for an uplink transmission of the UE 120. In some aspects, the DCI may indicate a first TCI and a second TCI (e.g., in a codepoint of a TCI field of the DCI). The first TCI and the second TCI may identify respective beams (or antenna groups) for the uplink transmission of the UE 120. In some aspects, a TCI may identify a reference signal, such as a channel state information reference signal (CSI-RS), a synchronization signal block (SSB), a sounding reference signal (SRS), and/or the like, which is associated with a beam or a reception spatial filter providing spatial relation information or quasi-co-location (QCL) information. In some aspects, a TCI may identify a reference signal set, such as a CSI-RS resource set, an SRS resource set, and/or the like.

In some aspects, the DCI may indicate a precoding matrix 310. For example, the DCI may indicate a TPMI index that maps to (e.g., according to a mapping stored by the UE 120) a TPMI associated with the precoding matrix 310. The precoding matrix 310 may include precoders for antennas in multiple layers. For example, the precoding matrix 310 may include precoders in multiple columns and multiple rows.

A column may represent (e.g., may be mapped to) a layer that is to be transmitted, and a row may represent (e.g., may be mapped to) an antenna index (e.g., an antenna port). Accordingly, $X_{0,0}$ of the precoding matrix 310 may represent a precoder for a first antenna (e.g., associated with antenna index 0) in a first layer (e.g., layer 0), $X_{1,0}$ of the precoding matrix 310 may represent a precoder for a second antenna (e.g., associated with antenna index 1) in the first layer (e.g., layer 0), $X_{0,1}$ of the precoding matrix 310 may represent a precoder for the first antenna (e.g., associated with antenna index 0) in a second layer (e.g., layer 1), and so forth. In some aspects, an antenna index may identify a physical uplink shared channel (PUSCH) antenna port (e.g., a TPMI antenna port). In some aspects, the precoding matrix 310 may include a different quantity of columns (i.e., layers) and/or rows (i.e., antennas) than as shown in FIG. 3.

In some aspects, a first set of antenna indices may form a first transmission group, and a second set of antenna indices may form a second transmission group. For example, as shown in FIG. 3, a first antenna 315 (associated with antenna index 0) and a third antenna 325 (associated with antenna index 2) may form the first transmission group, and a second antenna 320 (associated with antenna index 1) and a fourth antenna 330 (associated with antenna index 3) may form the second transmission group. In some aspects, the antenna indices that form the first transmission group and the antenna indices that form the second transmission group may be defined in a configuration of the UE 120. In some aspects, the configuration may identify different antenna indices for the first transmission group and the second transmission group than those described herein.

In some aspects, the first transmission group may be associated with the first TCI of the DCI, and the second transmission group may be associated with the second TCI of the DCI. For example, layers of the precoding matrix 310 that include precoders for one or more antennas of the first transmission group may be transmitted using a first antenna panel (i.e., using the one or more antennas of the first transmission group), and layers of the precoding matrix 310 that include precoders for one or more antennas of the second transmission group may be transmitted using a second antenna panel (i.e., using the one or more antennas of the second transmission group). In this case, a precoder having a non-zero value may be considered to be included in a precoding matrix, and a precoder having a zero value may be considered not to be included in a precoding matrix. In some aspects, a non-zero value in a precoding matrix may also be referred to as a valid antenna (or a valid antenna port) or a non-zero antenna (or a non-zero antenna port).

In some aspects, the DCI may indicate a set of DMRS antenna ports (e.g., in an antenna port(s) field of the DCI). For example, the DCI may indicate a DMRS antenna port index that maps to (e.g., according to a mapping stored by the UE 120) the set of DMRS antenna ports. A DMRS antenna port may be associated with a particular CDM group. For example, one or more first DMRS antenna ports of the set may be associated with a first CDM group, and one or more second DMRS antenna ports of the set may be associated with a second CDM group.

As shown by reference number 335, the UE 120 may determine a first association between a first transmission group and a first CDM group, and a second association between a second transmission group and a second CDM group. In some aspects, the UE 120 may determine the first association and the second association based at least in part on information that identifies the first association and the second association, as described in connection with FIG. 4. In some aspects, the UE 120 may determine the first association and the second association based at least in part on a mapping of DMRS ports to layers of the precoding matrix 310, as described in connection with FIG. 5.

As shown by reference number 340, the UE 120 may transmit, and the BS 110 may receive, an uplink transmission according to the first association and the second association. For example, the UE 120 may transmit layers, that are to be transmitted using the first transmission group and the first CDM group, using a first beam (e.g., using a first antenna panel), and transmit layers, that are to be transmitted using the second transmission group and the second CDM group, using a second beam (e.g., using a second antenna panel). In this way, the UE 120 may transmit a non-coherent joint transmission according to the first association and the second association.

As indicated above, FIG. 3 is provided as an example. Other examples may differ from what is described with respect to FIG. 3.

Figure 4:
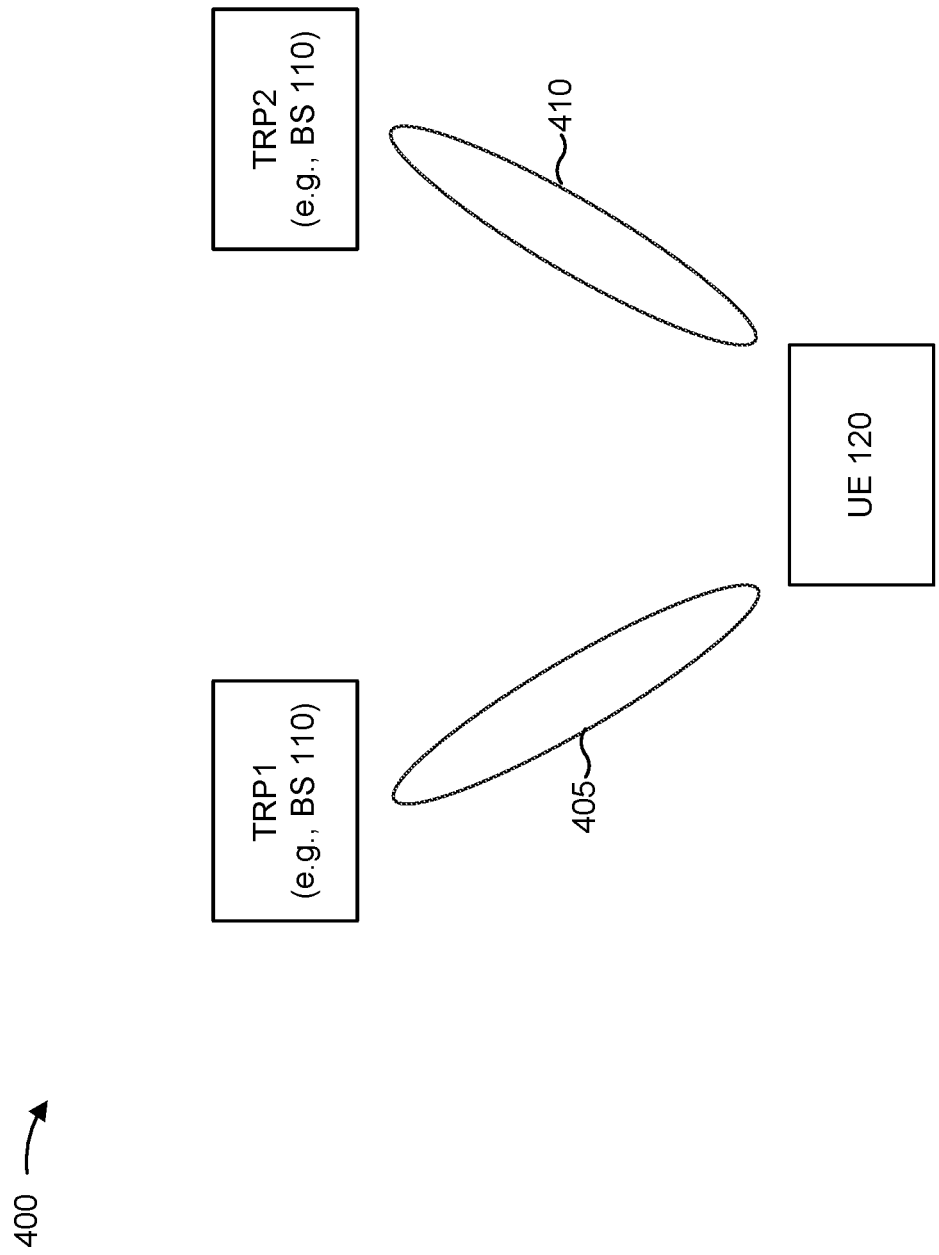

FIG. 4 is a diagram illustrating an example 400 of enabling non-coherent joint transmission, in accordance with the present disclosure. As described in connection with FIG. 3, the UE 120 may determine the first association between the first transmission group and the first CDM group, and the second association between the second transmission group and the second CDM group, based at least in part on information that identifies the first association and the second association. In some aspects, the information may be a rule that defines the first association and the second association. In some aspects, the BS 110 may transmit, and the UE 120 may receive, the information via radio resource control (RRC) signaling.

In some aspects, the information may identify an association (e.g., the first association or the second association) between a downlink CSI-RS antenna port set, a transmission group (e.g., the first transmission group or the second transmission group), a CDM group (e.g., in the case of a non-coherent joint transmission), and at least one of an uplink SRS antenna port set, an uplink SRS, or an uplink SRS set. For example, an association may be between CSI-RS antenna port set 0, transmission group 0, CDM group 0, and uplink SRS antenna port set 0, SRS 0, and/or SRS set 0 (which may be referred to herein as a first associated group). As another example, another association may be between CSI-RS antenna port set 1, transmission group 1, CDM group 1, and uplink SRS antenna port set 1, SRS 1, and/or SRS set 1 (which may be referred to herein as a second associated group). In some aspects, CSI-RS antenna port set 0 may include CSI-RS ports 0-7, and CSI-RS antenna port set 1 may include CSI-RS ports 8-15. In some aspects, SRS antenna port set 0 may include SRS ports 0 and 2, and SRS antenna port set 1 may include SRS ports 1 and 3.

In some aspects, the first associated group may be associated with a first TRP (TRP1), a first antenna panel of the UE 120, and/or the like, and the second associated group may be associated with a second TRP (TRP2), a second antenna panel of the UE 120, and/or the like. Accordingly, the first associated group may be associated with a first beam 405 (e.g., a beam, a reciprocal beam pair, and/or a beam cluster), and the second associated group may be associated with a second beam 410 (e.g., a beam, a reciprocal beam pair, and/or a beam cluster). In some aspects, the first associated group may be further associated with a first QCL assumption (e.g., QCL 0) and/or a first TCI state (e.g., TCI 0), and the second associated group may be further associated with a second QCL assumption (e.g., QCL 1) and/or a second TCI state (e.g., TCI 1).

As indicated above, FIG. 4 is provided as an example. Other examples may differ from what is described with respect to FIG. 4.

Figure 5:
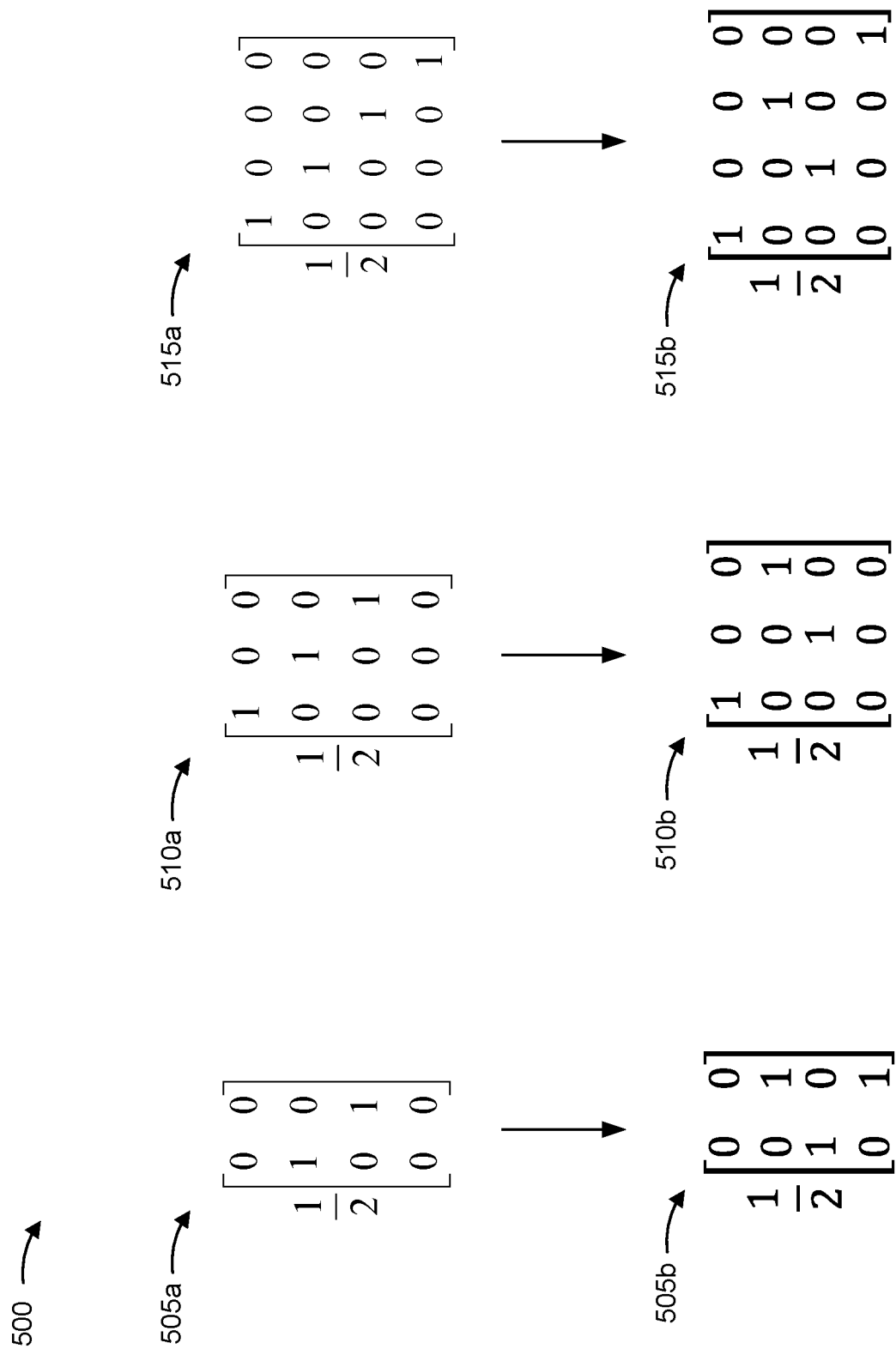

FIG. 5 is a diagram illustrating an example 500 of enabling non-coherent joint transmission, in accordance with the present disclosure. As described in connection with FIG. 3, the UE 120 may determine the first association between the first transmission group and the first CDM group, and the second association between the second transmission group and the second CDM group, based at least in part on a mapping of DMRS ports to layers of the precoding matrix 310. For example, the UE 120 may determine the first association based at least in part on mapping DMRS antenna ports of the first CDM group to one or more first layers that are to be transmitted using the first transmission group, and the second association based at least in part on mapping DMRS antenna ports of the second CDM group to one or more second layers that are to be transmitted using the second transmission group.

As shown in FIG. 5, in some aspects, the precoding matrix 310 may be precoding matrix 505a, precoding matrix 510a, or precoding matrix 515a. These precoding matrices may be legacy precoding matrices, as described above.

For example, a set of DMRS antenna ports [0, 1, 2, 3] may be mapped to the precoding matrix 515a according to an ordering of the set of DMRS antenna ports. In this case, DMRS antenna ports [0, 1] may be a first CDM group and DMRS antenna ports [2, 3] may be a second CDM group. Thus, according to the mapping, the first and second layers of the precoding matrix 515a are to be transmitted using the DMRS antenna ports of the first CDM group (e.g., DMRS antenna ports [0, 1]), and the third and fourth layers of the precoding matrix 515a are to be transmitted using the DMRS antenna ports of the second CDM group (e.g., DMRS antenna ports [2, 3]). However, the first and third layers are to be transmitted using antennas of the first transmission group (e.g., antenna indices 0 and 2, as described above), and the second and fourth layers are to be transmitted using antennas of the second transmission group (e.g., antenna indices 1 and 3). As a result, this legacy precoding matrix is unsuitable for a non-coherent joint transmission because a transmission group should use the same antenna panel (e.g., have an association with the same CDM group).

In some aspects, a set of DMRS antenna ports may be mapped to a precoding matrix (e.g., precoding matrix 310, precoding matrix 505a, precoding matrix 510a, precoding matrix 515a, and/or the like) in an order that is not according to an ordering of the set of DMRS antenna ports. For example, the set of DMRS antenna ports may be mapped first to layers of the precoding matrix that are to be transmitted using the first transmission group (e.g., layers that include precoders for the first transmission group), and second to layers of the precoding matrix that are to be transmitted using the second transmission group (e.g., layers that include precoders for the second transmission group).

For example, the set of DMRS antenna ports [0, 1, 2, 3] (where [0, 1] are a first CDM group and [2, 3] are a second CDM group) may be mapped first to the first and third layers of the precoding matrix 515a, which are to be transmitted using the first transmission group (e.g., antenna indices 0 and 2), and second to the second and fourth layers of the precoding matrix 515a, which are to be transmitted using the second transmission group (e.g., antenna indices 1 and 3). In this way, the first transmission group may be associated with the first CDM group, and the second transmission group may be associated with the second CDM group, thereby enabling non-coherent joint transmission.

In some aspects, a set of DMRS antenna ports may be ordered such that DMRS antenna ports of a first CDM group are mapped to layers of a precoding matrix (e.g., precoding matrix 310, precoding matrix 505a, precoding matrix 510a, precoding matrix 515a, and/or the like) that are to be transmitted using the first transmission group, and DMRS antenna ports of a second CDM group are mapped to layers of the precoding matrix that are to be transmitted using the second transmission group, when the set of DMRS antenna ports are mapped to the precoding matrix according to an ordering of the set of DMRS antenna ports. For example, the ordered set of DMRS antenna ports [0, 2, 1, 3] (where [0, 1] are a first CDM group and [2, 3] are a second CDM group) may be mapped to the layers of the precoding matrix 515a according to an ordering of the ordered set of DMRS antenna ports. As a result, DMRS antenna ports of the first CDM group are mapped to the first and third layers of the precoding matrix 515a, and DMRS antenna ports of the second CDM group are mapped to the second and fourth layers of the precoding matrix 515a. In this way, the first transmission group may be associated with the first CDM group, and the second transmission group may be associated with the second CDM group, thereby enabling non-coherent joint transmission.

In some aspects, an ordered set of DMRS antenna ports may be associated with an index value in a mapping stored by the UE 120. For example, a set of DMRS antenna ports [0, 2, 1, 3], described above, may be mapped in the mapping, a set of DMRS antenna ports [0, 2] may be mapped in the mapping, a set of DMRS antenna ports [0, 2, 1] may be mapped in the mapping, and/or the like. Accordingly, DCI received by the UE 120 may indicate a particular ordered set of DMRS antenna ports that is to be used for an uplink transmission by indicating an associated index value.

In some aspects, a set of DMRS antenna ports may be mapped to a precoding matrix in an order that is according to an ordering of the set of DMRS antenna ports, and layers of the precoding matrix that are to be transmitted using the same transmission group may be consecutive layers of the precoding matrix. For example, the layers of the legacy precoding matrix 505a may be rearranged as shown for precoding matrix 505b, the layers of the legacy precoding matrix 510a may be rearranged as shown for precoding matrix 510b, and the layers of the legacy precoding matrix 515a may be rearranged as shown for precoding matrix 515b.

As an example, the first and second layers (i.e., consecutive layers) of the precoding matrix 515b are to be transmitted using the first transmission group (e.g., antenna indices 0 and 2), and the third and fourth layers (i.e., consecutive layers) of the precoding matrix 515b are to be transmitted using the second transmission group. Accordingly, a set of DMRS antenna ports [0, 1, 2, 3] (where [0, 1] are a first CDM group and [2, 3] are a second CDM group) may be mapped to the precoding matrix 515b according to an ordering of the set of DMRS antenna ports. For example, DMRS antenna ports of the first CDM group may be mapped to the first and second layers of the precoding matrix 515b, which are to be transmitted using the first transmission group (e.g., antenna indices 0 and 2), and DMRS antenna ports of the second CDM group may be mapped to the third and fourth layers of the precoding matrix 515b, which are to be transmitted using the second transmission group (e.g., antenna indices 1 and 3). In this way, the first transmission group may be associated with the first CDM group, and the second transmission group may be associated with the second CDM group, thereby enabling non-coherent joint transmission.

In some aspects, precoding matrices 505b, 510b, and/or 515b may be associated with a respective index value in a mapping (e.g., a TPMI mapping) stored by the UE 120. Accordingly, DCI received by the UE 120 may indicate a particular precoding matrix 505b, 510b, and/or 515b that is to be used for an uplink transmission by indicating an associated index value.

As indicated above, FIG. 5 is provided as an example. Other examples may differ from what is described with respect to FIG. 5.

Figure 6:
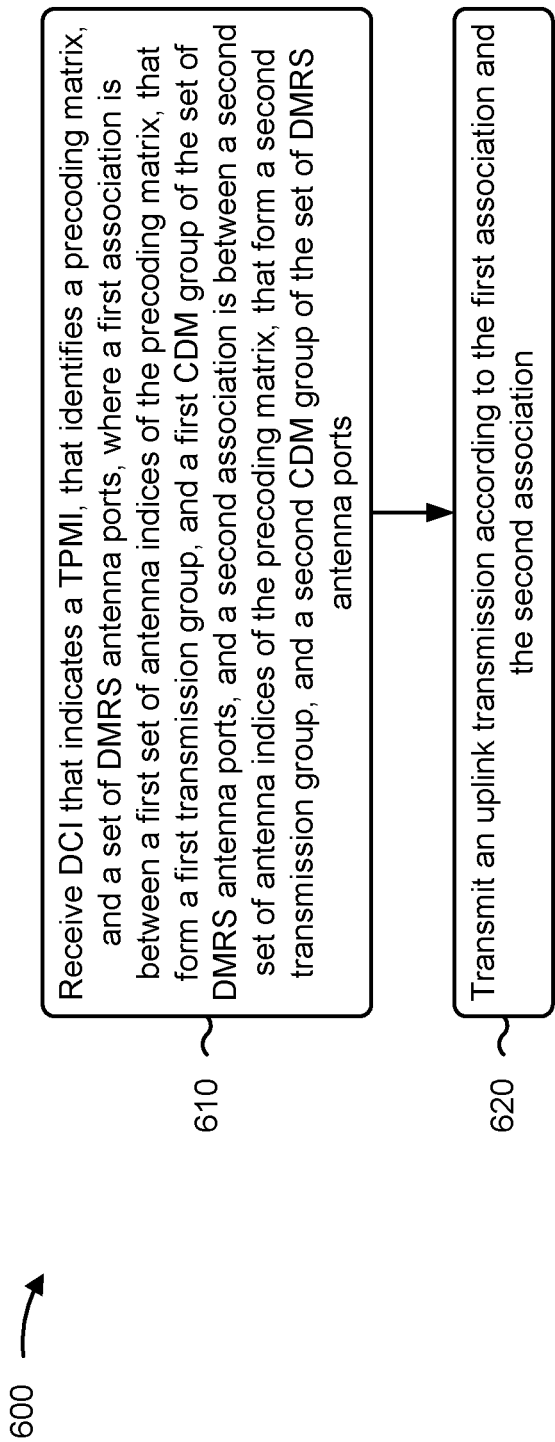
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120, and/or the like) performs operations associated with enabling non-coherent joint transmission.

As shown in FIG. 6, in some aspects, process 600 may include receiving DCI that indicates a TPMI, that identifies a precoding matrix, and a set of DMRS antenna ports, where a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports (block 610). For example, the UE (e.g., using antenna 252, DEMOD 254, MIMO detector 256, receive processor 258, controller/processor 280, and/or the like) may receive DCI that indicates a TPMI, that identifies a precoding matrix, and a set of DMRS antenna ports, as described above in connection with FIGS. 3-5. In some aspects, a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports.

As further shown in FIG. 6, in some aspects, process 600 may include transmitting an uplink transmission according to the first association and the second association (block 620). For example, the UE (e.g., using transmit processor 264, TX MIMO processor 266, MOD 254, antenna 252, controller/processor 280, and/or the like) may transmit an uplink transmission according to the first association and the second association, as described above in connection with FIGS. 3-5.

In a first aspect, the set of DMRS antenna ports are mapped to layers of the precoding matrix, and the first association and the second association are based at least in part on a determination that DMRS antenna ports of the first CDM group are mapped to one or more first layers that are to be transmitted using the first transmission group, and DMRS antenna ports of the second CDM group are mapped to one or more second layers that are to be transmitted using the second transmission group.

In a second aspect, alone or in combination with the first aspect, the set of DMRS antenna ports are mapped to the layers of the precoding matrix according to an ordering of the set of DMRS antenna ports, and the one or more first layers are consecutive layers in the precoding matrix and the one or more second layers are consecutive layers in the precoding matrix.

In a third aspect, alone or in combination with one or more of the first and second aspects, the set of DMRS antenna ports are mapped first to the layers of the precoding matrix that are to be transmitted using the first transmission group, and second to the layers of the precoding matrix that are to be transmitted using the second transmission group.

In a fourth aspect, alone or in combination with one or more of the first through third aspects, the set of DMRS antenna ports are mapped to the layers of the precoding matrix according to an ordering of the set of DMRS antenna ports, and the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

In a fifth aspect, alone or in combination with one or more of the first through fourth aspects, the first association and the second association are based at least in part on information that identifies the first association and the second association. In a sixth aspect, alone or in combination with one or more of the first through fifth aspects, the information is received via RRC signaling.

In a seventh aspect, alone or in combination with one or more of the first through sixth aspects, the information identifies an association between a CSI-RS antenna port set, a transmission group, a CDM group, and at least one of an SRS antenna port set, an SRS, or an SRS set. In an eighth aspect, alone or in combination with one or more of the first through seventh aspects, the association is further with at least one of a QCL assumption or a TCI state.

Process 600 may include additional aspects, such as any single aspect or any combination of aspects described below and/or in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
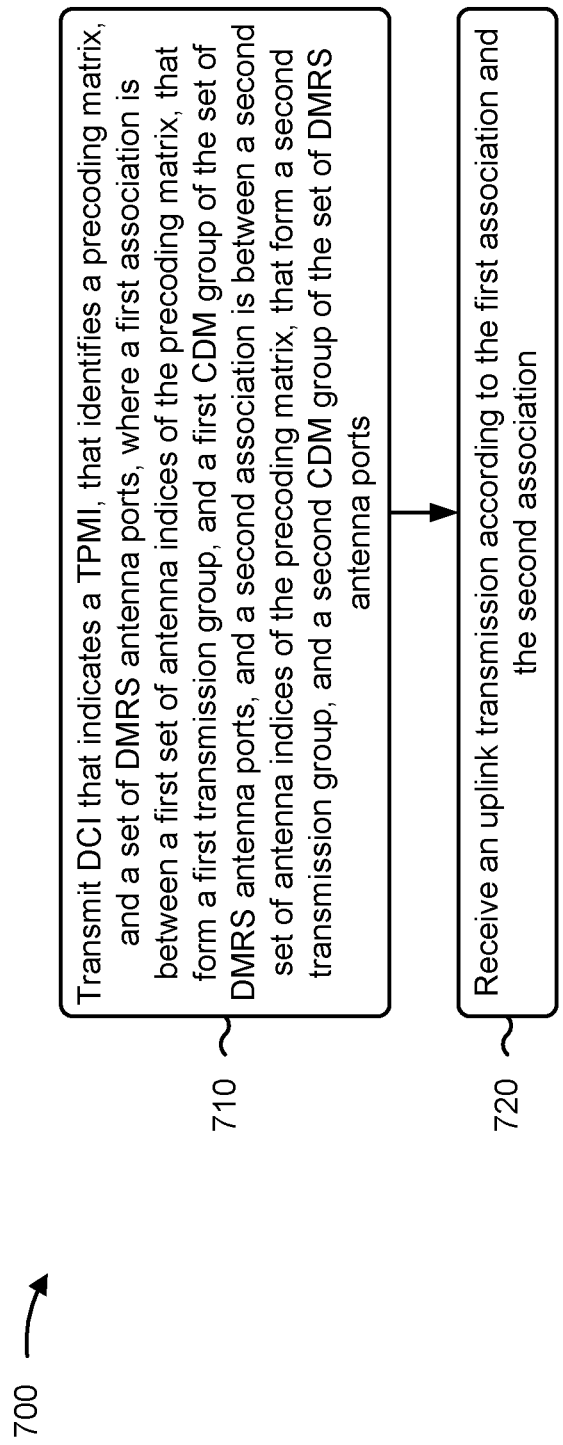
FIG. 7 is a diagram illustrating an example process performed, for example, by a BS, in accordance with the present disclosure.

FIG. 7 is a diagram illustrating an example process 700 performed, for example, by a base station, in accordance with the present disclosure. Example process 700 is an example where the base station (e.g., BS 110, and/or the like) performs operations associated with enabling non-coherent joint transmission.

As shown in FIG. 7, in some aspects, process 700 may include transmitting DCI that indicates a TPMI, that identifies a precoding matrix, and a set of DMRS antenna ports, where a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports (block 710). For example, the base station (e.g., using controller/processor 240, transmit processor 220, TX MIMO processor 230, MOD 232, antenna 234, and/or the like) may transmit DCI that indicates a TPMI, that identifies a precoding matrix, and a set of DMRS antenna ports, as described above in connection with FIGS. 3-5. In some aspects, a first association is between a first set of antenna indices of the precoding matrix, that form a first transmission group, and a first CDM group of the set of DMRS antenna ports, and a second association is between a second set of antenna indices of the precoding matrix, that form a second transmission group, and a second CDM group of the set of DMRS antenna ports.

As further shown in FIG. 7, in some aspects, process 700 may include receiving an uplink transmission according to the first association and the second association (block 720). For example, the base station (e.g., using antenna 234, DEMOD 232, MIMO detector 236, receive processor 238, controller/processor 240, and/or the like) may receive an uplink transmission according to the first association and the second association, as described above in connection with FIGS. 3-5.

In a first aspect, the set of DMRS antenna ports are to be mapped to layers of the precoding matrix, and the first association and the second association are based at least in part on DMRS antenna ports of the first CDM group being mapped to one or more first layers that are to be transmitted by the UE using the first transmission group, and DMRS antenna ports of the second CDM group being mapped to one or more second layers that are to be transmitted by the UE using the second transmission group.

In a second aspect, alone or in combination with the first aspect, the set of DMRS antenna ports are to be mapped to the layers of the precoding matrix according to an ordering of the set of DMRS antenna ports, and the one or more first layers are consecutive layers in the precoding matrix and the one or more second layers are consecutive layers in the precoding matrix.

In a third aspect, alone or in combination with one or more of the first and second aspects, the set of DMRS antenna ports are to be mapped first to the layers of the precoding matrix that are to be transmitted by the UE using the first transmission group, and second to the layers of the precoding matrix that are to be transmitted by the UE using the second transmission group.

In a fourth aspect, alone or in combination with one or more of the first through third aspects, the set of DMRS antenna ports are to be mapped to the layers of the precoding matrix according to an ordering of the set of DMRS antenna ports, and the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

In a fifth aspect, alone or in combination with one or more of the first through fourth aspects, the first association and the second association are based at least in part on information that identifies the first association and the second association. In a sixth aspect, alone or in combination with one or more of the first through fifth aspects, the information is transmitted via RRC signaling.

In a seventh aspect, alone or in combination with one or more of the first through sixth aspects, the information identifies an association between a CSI-RS antenna port set, a transmission group, a CDM group, and at least one of an SRS antenna port set, an SRS, or an SRS set. In an eighth aspect, alone or in combination with one or more of the first through seventh aspects, the association is further with at least one of a QCL assumption or a TCI state.

Process 700 may include additional aspects, such as any single aspect or any combination of aspects described below and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
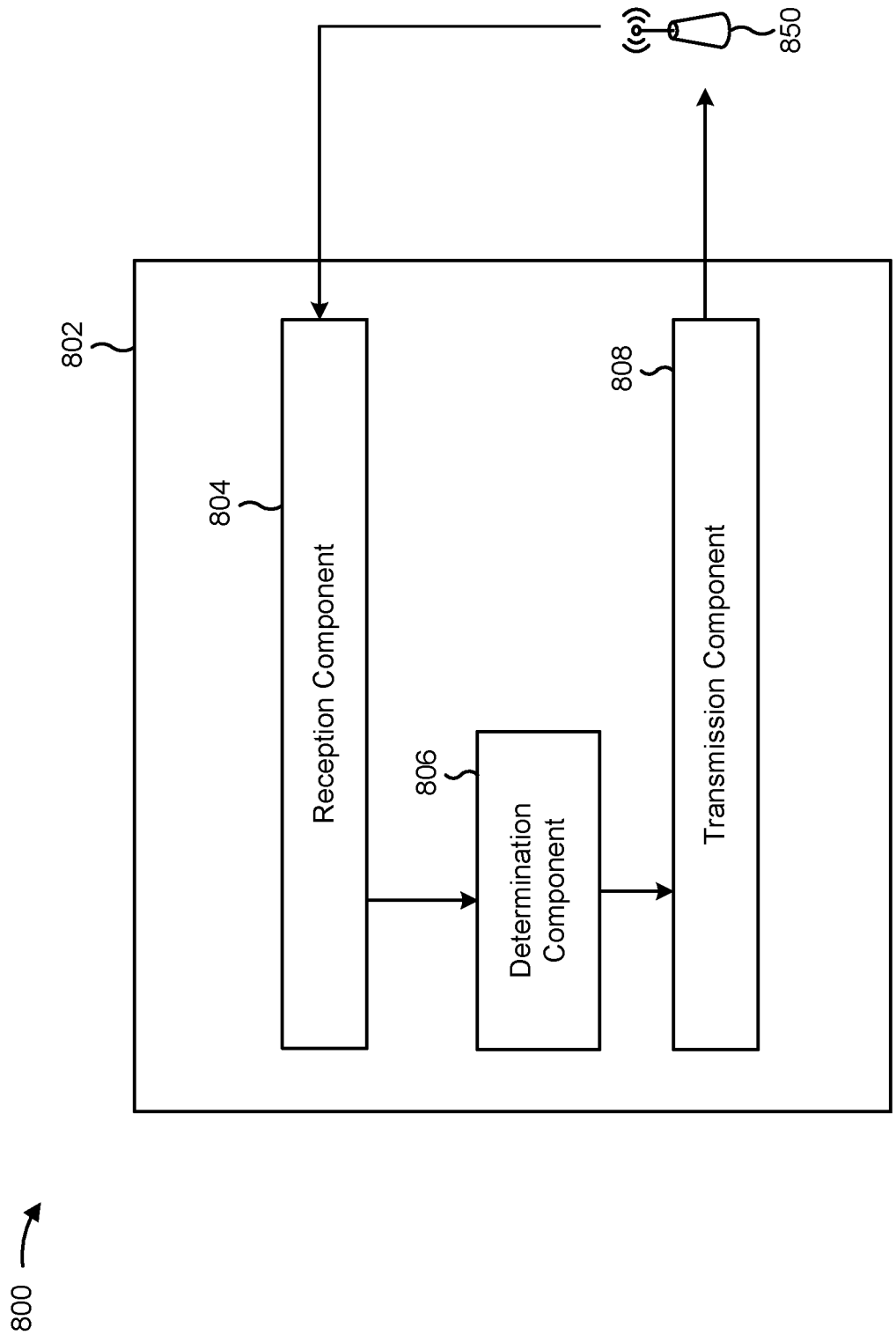
FIG. 8 is a diagram illustrating an example of a data flow between different components in an example apparatus, in accordance with the present disclosure.

FIG. 8 is a diagram 800 illustrating a data flow between different components in an example apparatus 802. The apparatus 802 may be a UE (e.g., UE 120). In some aspects, the apparatus 802 includes a reception component 804, a determination component 806, and/or a transmission component 808.

In some aspects, the reception component 804 may receive DCI that indicates a TPMI, that identifies a precoding matrix, and a set of DMRS antenna ports. The reception component 804 may receive the DCI from an apparatus 850 (e.g., a BS 110). The reception component 804 may provide information identifying the TPMI and the set of DMRS antenna ports to the determination component 806.

In some aspects, the determination component 806 may determine a first association between a first set of antenna indices of the precoding matrix, that form a first transmission group, and a first CDM group of the set of DMRS antenna ports, and a second association between a second set of antenna indices of the precoding matrix, that form a second transmission group, and a second CDM group of the set of DMRS antenna ports. The determination component 806 may provide information identifying the first association and the second association to the transmission component 808.

In some aspects, the transmission component 808 may transmit an uplink transmission (e.g., a non-coherent joint transmission) based at least in part on the first association and the second association. The transmission component 808 may transmit the uplink transmission to the apparatus 850.

The apparatus may include additional components that perform each of the blocks of the algorithm in the aforementioned process 600 of FIG. 6, and/or the like. Each block in the aforementioned process 600 of FIG. 6, and/or the like, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
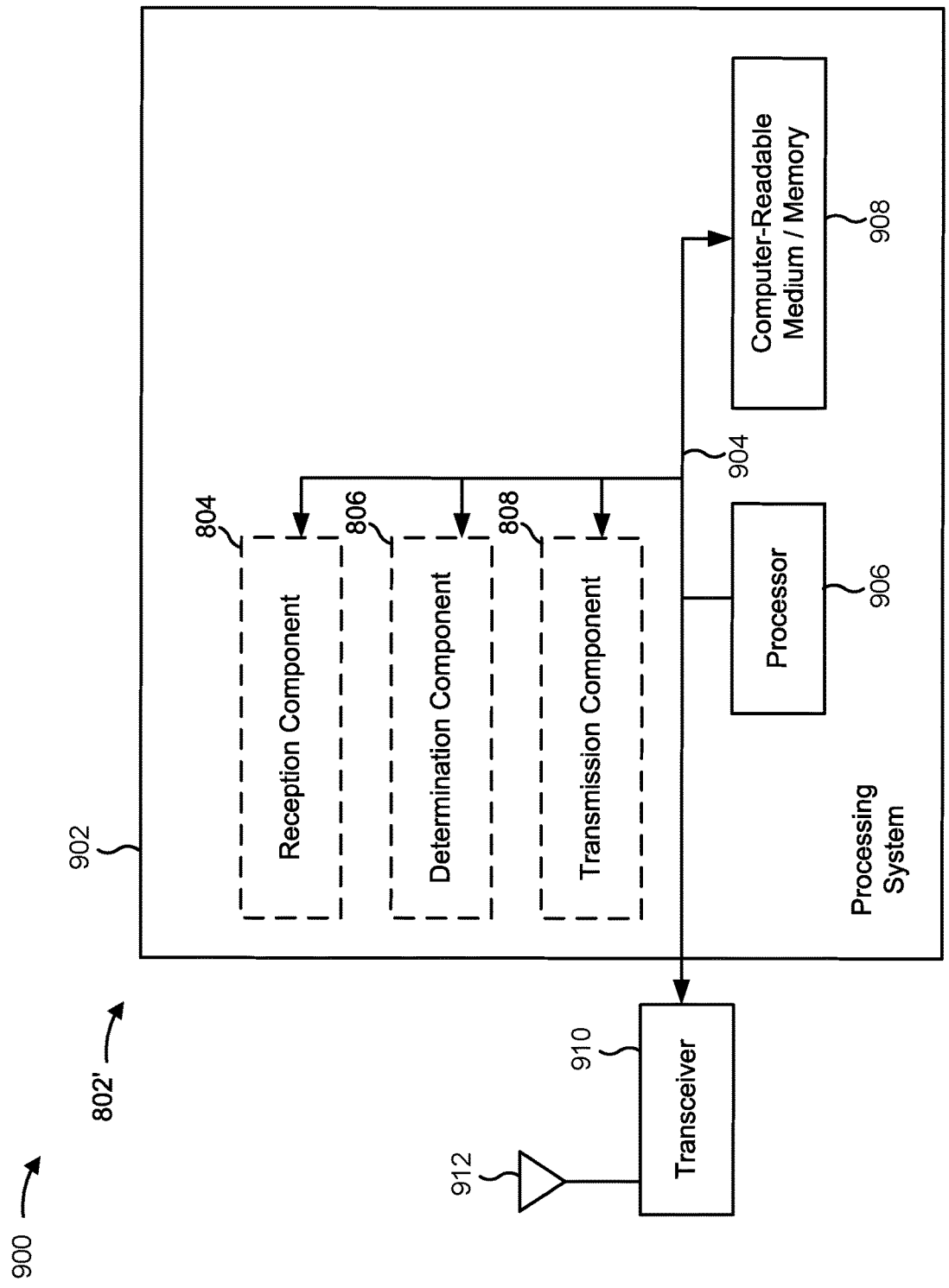
FIG. 9 is a diagram illustrating an example of a hardware implementation for an apparatus employing a processing system, in accordance with the present disclosure.

FIG. 9 is a diagram 900 illustrating an example of a hardware implementation for an apparatus 802' employing a processing system 902. The apparatus 802' may be a UE (e.g., UE 120).

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware components, represented by the processor 906, the components 804, 806, and/or 808, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception component 804. In addition, the transceiver 910 receives information from the processing system 902, specifically the transmission component 808, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the components 804, 806, and/or 808. The components may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the receive processor 258, and/or the controller/processor 280.

In some aspects, the apparatus 802/802' for wireless communication includes means for receiving DCI that indicates a TPMI, that identifies a precoding matrix, and a set of DMRS antenna ports, means for determining a first association between a first set of antenna indices of the precoding matrix, that form a first transmission group, and a first CDM group of the set of DMRS antenna ports, and a second association between a second set of antenna indices of the precoding matrix, that form a second transmission group, and a second CDM group of the set of DMRS antenna ports, and/or the like. The aforementioned means may be one or more of the aforementioned components of the apparatus 802 and/or the processing system 902 of the apparatus 802' configured to perform the functions recited by the aforementioned means. As described elsewhere herein, the processing system 902 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

FIG. 9 is provided as an example. Other examples may differ from what is described in connection with FIG. 9.

Figure 10:
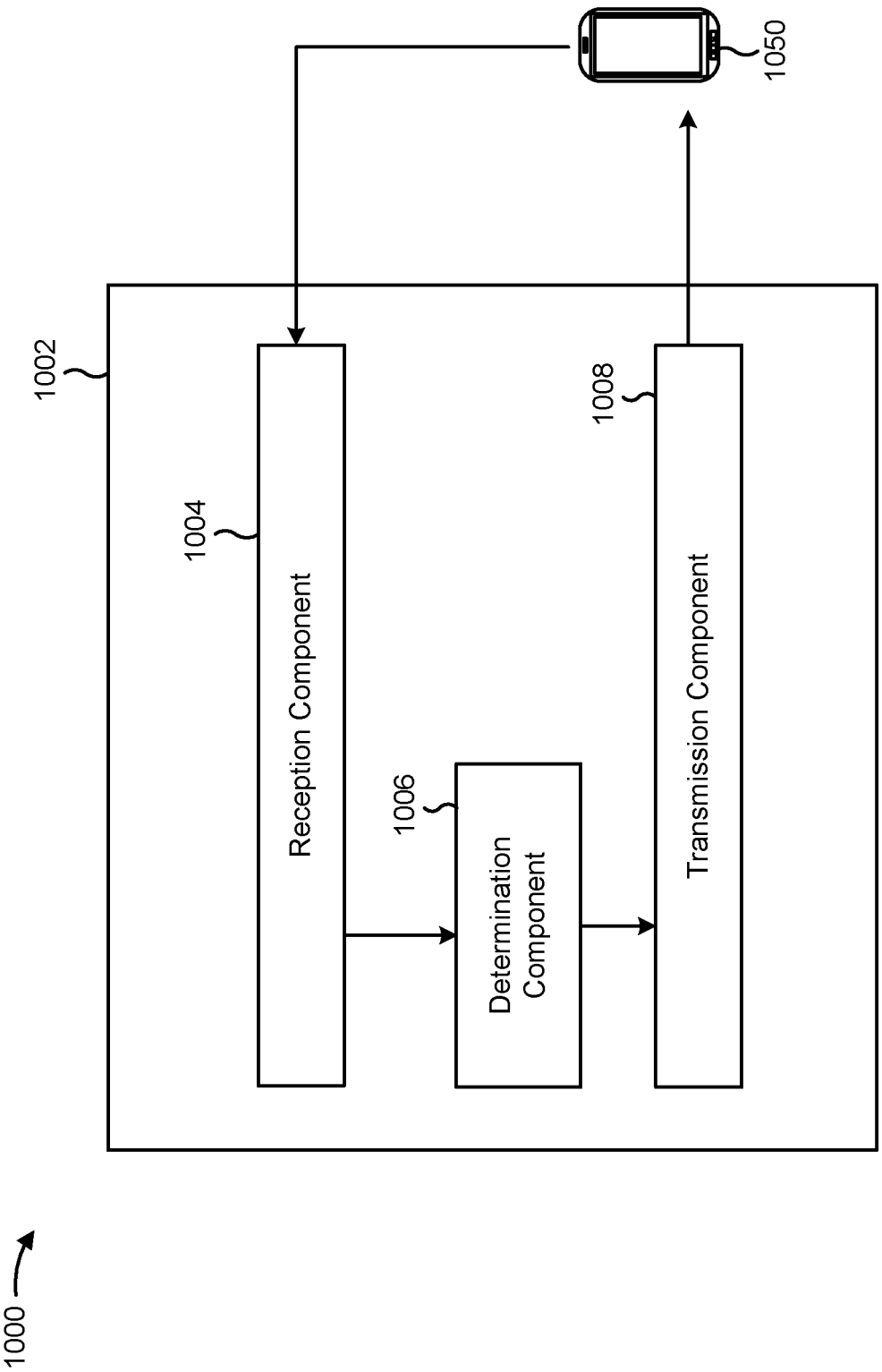
FIG. 10 is a diagram illustrating an example of a data flow between different components in an example apparatus, in accordance with the present disclosure.

FIG. 10 is a diagram 1000 illustrating a data flow between different components in an example apparatus 1002. The apparatus 1002 may be a BS (e.g., BS 110). In some aspects, the apparatus 1002 includes a reception component 1004, a determination component 1006, and/or a transmission component 1008.

In some aspects, the reception component 1004 may receive an uplink transmission (e.g., an uplink transmission of a non-coherent joint transmission) from an apparatus 1050 (e.g., a UE 120). The reception component 1004 may provide information relating to the reception of the uplink transmission to the determination component 1006. For example, the information may indicate that the uplink transmission was received and/or indicate that another uplink transmission is to be scheduled based at least in part on receiving the uplink transmission.

In some aspects, the determination component 1006 may determine a TPMI, that identifies a precoding matrix, and a set of DMRS antenna ports for the apparatus 1050. The determination component 1006 may provide information identifying the TPMI and the set of DMRS antenna ports to the transmission component 1008.

In some aspects, the transmission component 1008 may transmit DCI that indicates the TPMI and the set of DMRS antenna ports to enable the apparatus 1050 to determine a first association between a first set of antenna indices of the precoding matrix, that form a first transmission group, and a first CDM group of the set of DMRS antenna ports, and a second association between a second set of antenna indices of the precoding matrix, that form a second transmission group, and a second CDM group of the set of DMRS antenna ports. The transmission component 1008 may transmit the DCI to the apparatus 1050.

The apparatus may include additional components that perform each of the blocks of the algorithm in the aforementioned process 700 of FIG. 7, and/or the like. Each block in the aforementioned process 700 of FIG. 7, and/or the like, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 1000 are provided as an example. In practice, there may be additional components, fewer components, different components, or differently arranged components than those shown in FIG. 1000. Furthermore, two or more components shown in FIG. 1000 may be implemented within a single component, or a single component shown in FIG. 1000 may be implemented as multiple, distributed components. Additionally, or alternatively, a set of components (e.g., one or more components) shown in FIG. 1000 may perform one or more functions described as being performed by another set of components shown in FIG. 1000.

Figure 11:
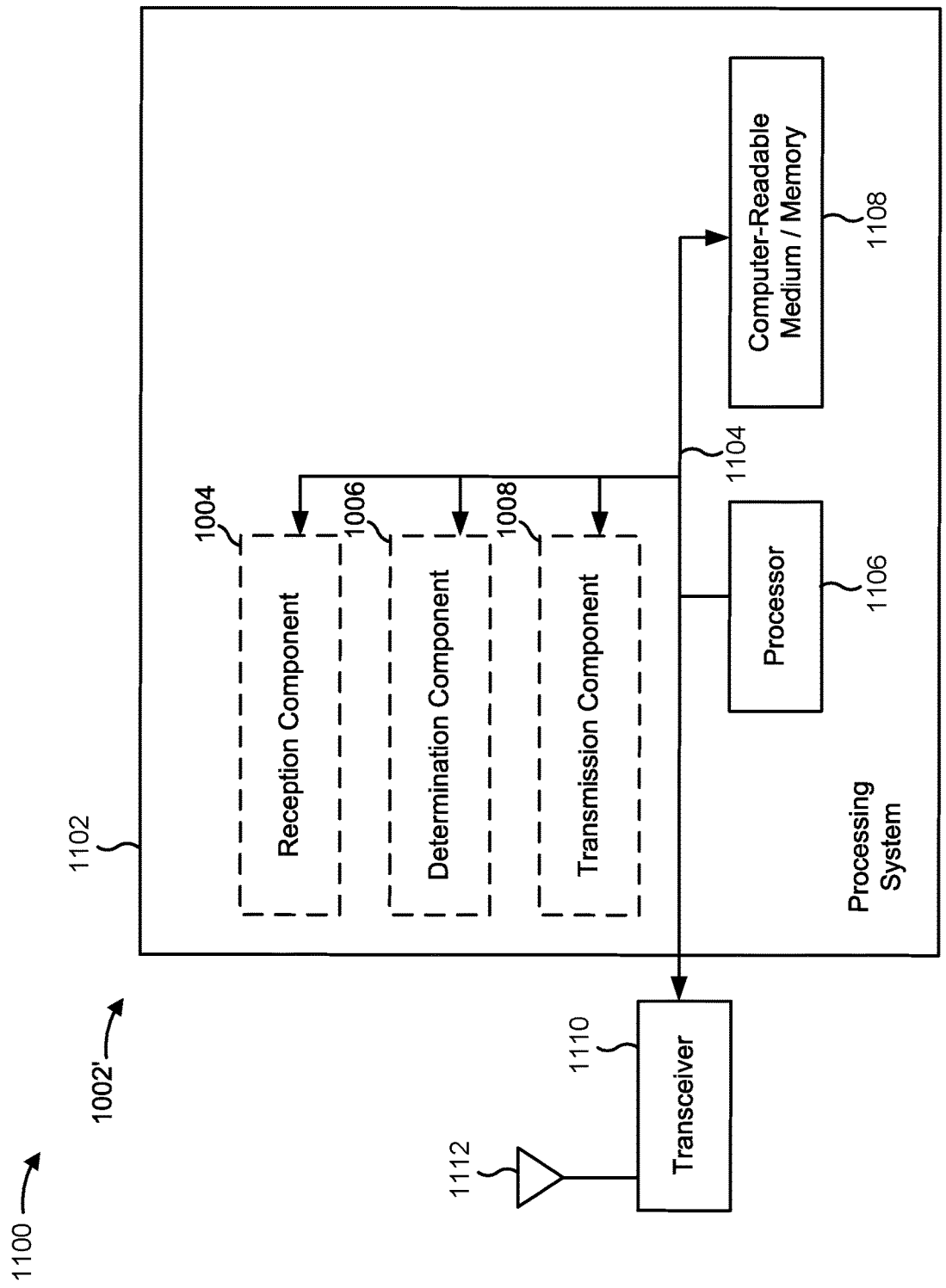
FIG. 11 is a diagram illustrating an example of a hardware implementation for an apparatus employing a processing system, in accordance with the present disclosure.

FIG. 11 is a diagram 1100 illustrating an example of a hardware implementation for an apparatus 1002' employing a processing system 1102. The apparatus 1002' may be a BS (e.g., BS 110).

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware components, represented by the processor 1106, the components 1004, 1006, and/or 1008, and the computer-readable medium/memory 1108. The bus 1104 may also link various other circuits such as timing sources, peripherals, voltage regulators, and power management circuits, which are well known in the art, and therefore will not be described any further.

The processing system 1102 may be coupled to a transceiver 1110. The transceiver 1110 is coupled to one or more antennas 1112. The transceiver 1110 provides a means for communicating with various other apparatuses over a transmission medium. The transceiver 1110 receives a signal from the one or more antennas 1112, extracts information from the received signal, and provides the extracted information to the processing system 1102, specifically the reception component 1004. In addition, the transceiver 1110 receives information from the processing system 1102, specifically the transmission component 1008, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the components 1004, 1006, and/or 1008. The components may be software modules running in the processor 1106, resident/stored in the computer readable medium/memory 1108, one or more hardware modules coupled to the processor 1106, or some combination thereof. The processing system 1102 may be a component of the BS 110 and may include the memory 242 and/or at least one of the TX MIMO processor 230, the receive processor 238, and/or the controller/processor 240.

In some aspects, the apparatus 1002/1002' for wireless communication includes means for determining a TPMI, that identifies a precoding matrix, and a set of DMRS antenna ports for a UE, means for transmitting DCI that indicates the TPMI and the set of DMRS antenna ports to enable the UE to determine a first association between a first set of antenna indices of the precoding matrix, that form a first transmission group, and a first CDM group of the set of DMRS antenna ports, and a second association between a second set of antenna indices of the precoding matrix, that form a second transmission group, and a second CDM group of the set of DMRS antenna ports, and/or the like. The aforementioned means may be one or more of the aforementioned components of the apparatus 1002 and/or the processing system 1102 of the apparatus 1002' configured to perform the functions recited by the aforementioned means. As described elsewhere herein, the processing system 1102 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 11 is provided as an example. Other examples may differ from what is described in connection with FIG. 11.

The following provides an overview of some Aspects of the present disclosure:

Aspect 1: A method of wireless communication performed by a user equipment (UE), comprising: receiving downlink control information that indicates a transmit precoding matrix indicator, that identifies a precoding matrix, and a set of demodulation reference signal (DMRS) antenna ports, wherein a first association is between a first set of antenna indices of the precoding matrix, that form a first transmission group, and a first code-division multiplexing (CDM) group of the set of DMRS antenna ports, and a second association is between a second set of antenna indices of the precoding matrix, that form a second transmission group, and a second CDM group of the set of DMRS antenna ports; and transmitting an uplink transmission according to the first association and the second association.

Aspect 2: The method of Aspect 1, wherein the set of DMRS antenna ports are mapped to layers of the precoding matrix, and wherein the first association and the second association are based at least in part on a determination that DMRS antenna ports of the first CDM group are mapped to one or more first layers that are to be transmitted using the first transmission group, and DMRS antenna ports of the second CDM group are mapped to one or more second layers that are to be transmitted using the second transmission group.

Aspect 3: The method of Aspect 2, wherein the set of DMRS antenna ports are mapped to the layers of the precoding matrix according to an ordering of the set of DMRS antenna ports, and wherein the one or more first layers are consecutive layers in the precoding matrix and the one or more second layers are consecutive layers in the precoding matrix.

Aspect 4: The method of Aspect 2, wherein the set of DMRS antenna ports are mapped first to the layers of the precoding matrix that are to be transmitted using the first transmission group, and second to the layers of the precoding matrix that are to be transmitted using the second transmission group.

Aspect 5: The method of Aspect 2, wherein the set of DMRS antenna ports are mapped to the layers of the precoding matrix according to an ordering of the set of DMRS antenna ports, and wherein the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

Aspect 6: The method of any of Aspects 1-5, wherein the first association and the second association are based at least in part on information that identifies the first association and the second association.

Aspect 7: The method of Aspect 6, wherein the information is received via radio resource control signaling.

Aspect 8: The method of any of Aspects 6-7, wherein the information identifies an association between a channel state information reference signal (CSI-RS) antenna port set, a transmission group, a CDM group, and at least one of a sounding reference signal (SRS) antenna port set, an SRS, or an SRS set.

Aspect 9: The method of Aspect 8, wherein the association is further with at least one of a quasi-co-location assumption or a transmission configuration indicator state.

Aspect 10: A method of wireless communication performed by a base station, comprising: transmitting downlink control information that indicates a transmit precoding matrix indicator, that identifies a precoding matrix, and a set of demodulation reference signal (DMRS) antenna ports, wherein a first association is between a first set of antenna indices of the precoding matrix, that form a first transmission group, and a first code-division multiplexing (CDM) group of the set of DMRS antenna ports, and a second association is between a second set of antenna indices of the precoding matrix, that form a second transmission group, and a second CDM group of the set of DMRS antenna ports; and receiving an uplink transmission according to the first association and the second association.

Aspect 11: The method of Aspect 10, wherein the set of DMRS antenna ports are to be mapped to layers of the precoding matrix, and wherein the first association and the second association are based at least in part on DMRS antenna ports of the first CDM group being mapped to one or more first layers that are to be transmitted by the UE using the first transmission group, and DMRS antenna ports of the second CDM group being mapped to one or more second layers that are to be transmitted by the UE using the second transmission group.

Aspect 12: The method of Aspect 11, wherein the set of DMRS antenna ports are to be mapped to the layers of the precoding matrix according to an ordering of the set of DMRS antenna ports, and wherein the one or more first layers are consecutive layers in the precoding matrix and the one or more second layers are consecutive layers in the precoding matrix.

Aspect 13: The method of Aspect 11, wherein the set of DMRS antenna ports are to be mapped first to the layers of the precoding matrix that are to be transmitted by the UE using the first transmission group, and second to the layers of the precoding matrix that are to be transmitted by the UE using the second transmission group.

Aspect 14: The method of Aspect 11, wherein the set of DMRS antenna ports are to be mapped to the layers of the precoding matrix according to an ordering of the set of DMRS antenna ports, and wherein the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

Aspect 15: The method of any of Aspects 10-14, wherein the first association and the second association are based at least in part on information that identifies the first association and the second association.

Aspect 16: The method of Aspect 15, wherein the information is transmitted via radio resource control signaling.

Aspect 17: The method of any of Aspects 15-16, wherein the information identifies an association between a channel state information reference signal (CSI-RS) antenna port set, a transmission group, a CDM group, and at least one of a sounding reference signal (SRS) antenna port set, an SRS, or an SRS set.

Aspect 18: The method of Aspect 17, wherein the association is further with at least one of a quasi-co-location assumption or a transmission configuration indicator state.

Aspect 19: An apparatus for wireless communication at a device, comprising a processor; memory coupled with the processor; and instructions stored in the memory and executable by the processor to cause the apparatus to perform the method of one or more Aspects of Aspects 1-9.

Aspect 20: A device for wireless communication, comprising a memory and one or more processors coupled to the memory, the memory and the one or more processors configured to perform the method of one or more Aspects of Aspects 1-9.

Aspect 21: An apparatus for wireless communication, comprising at least one means for performing the method of one or more Aspects of Aspects 1-9.

Aspect 22: A non-transitory computer-readable medium storing code for wireless communication, the code comprising instructions executable by a processor to perform the method of one or more Aspects of Aspects 1-9.

Aspect 23: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 19: An apparatus for wireless communication at a device, comprising a processor; memory coupled with the processor; and instructions stored in the memory and executable by the processor to cause the apparatus to perform the method of one or more Aspects of Aspects 10-18.

Aspect 20: A device for wireless communication, comprising a memory and one or more processors coupled to the memory, the memory and the one or more processors configured to perform the method of one or more Aspects of Aspects 10-18.

Aspect 21: An apparatus for wireless communication, comprising at least one means for performing the method of one or more Aspects of Aspects 10-18.

Aspect 22: A non-transitory computer-readable medium storing code for wireless communication, the code comprising instructions executable by a processor to perform the method of one or more Aspects of Aspects 10-18.

Aspect 23: A non-transitory computer-readable medium storing a set of instructions for wireless communication, the set of instructions comprising one or more instructions that, when executed by one or more processors of a device, cause the device to perform the method of one or more Aspects of Aspects 10-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors coupled to the memory, the one or more processors configured to:
      receive downlink control information that indicates a transmit precoding matrix indicator, that identifies a precoding matrix, and a set of demodulation reference signal (DMRS) antenna ports, wherein:
         a first association is between a first set of antenna indices of the precoding matrix, that form a first transmission group, and a first code-division multiplexing (CDM) group of the set of DMRS antenna ports,
         a second association is between a second set of antenna indices of the precoding matrix, that form a second transmission group, and a second CDM group of the set of DMRS antenna ports, and
         the first set of antenna indices is different than the second set of antenna indices and the first CDM group is different than the second CDM group; and
      transmit an uplink transmission according to the first association and the second association.

2. The UE of claim 1, wherein the set of DMRS antenna ports are mapped to layers of the precoding matrix, and
   wherein the first association and the second association are based at least in part on a determination that DMRS antenna ports of the first CDM group are mapped to one or more first layers that are to be transmitted using the first transmission group, and DMRS antenna ports of the second CDM group are mapped to one or more second layers that are to be transmitted using the second transmission group.

3. The UE of claim 2, wherein the set of DMRS antenna ports are mapped to the layers of the precoding matrix according to an ordering of the set of DMRS antenna ports, and
   wherein the one or more first layers are consecutive layers in the precoding matrix and the one or more second layers are consecutive layers in the precoding matrix.

4. The UE of claim 2, wherein the set of DMRS antenna ports are mapped first to the layers of the precoding matrix that are to be transmitted using the first transmission group, and second to the layers of the precoding matrix that are to be transmitted using the second transmission group.

5. The UE of claim 2, wherein the set of DMRS antenna ports are mapped to the layers of the precoding matrix according to an ordering of the set of DMRS antenna ports, and
wherein the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

6. The UE of claim 1, wherein the first association and the second association are based at least in part on information that identifies the first association and the second association.

7. The UE of claim 6, wherein the information is received via radio resource control signaling.

8. The UE of claim 6, wherein the information identifies an association between a channel state information reference signal (CSI-RS) antenna port set, a transmission group, a CDM group, and at least one of a sounding reference signal (SRS) antenna port set, an SRS, or an SRS set.

9. The UE of claim 8, wherein the association is further with at least one of a quasi-co-location assumption or a transmission configuration indicator state.

10. A base station for wireless communication, comprising:
memory; and
one or more processors coupled to the memory, the one or more processors configured to:
transmit downlink control information that indicates a transmit precoding matrix indicator, that identifies a precoding matrix, and a set of demodulation reference signal (DMRS) antenna ports, wherein:
a first association is between a first set of antenna indices of the precoding matrix, that form a first transmission group, and a first code-division multiplexing (CDM) group of the set of DMRS antenna ports,
a second association is between a second set of antenna indices of the precoding matrix, that form a second transmission group, and a second CDM group of the set of DMRS antenna ports, and
the first set of antenna indices is different than the second set of antenna indices and the first CDM group is different than the second CDM group; and
receive an uplink transmission according to the first association and the second association.

11. The base station of claim 10, wherein the set of DMRS antenna ports are to be mapped to layers of the precoding matrix, and
wherein the first association and the second association are based at least in part on DMRS antenna ports of the first CDM group being mapped to one or more first layers that are to be transmitted by a user equipment (UE) using the first transmission group, and DMRS antenna ports of the second CDM group being mapped to one or more second layers that are to be transmitted by the UE using the second transmission group.

12. The base station of claim 11, wherein the set of DMRS antenna ports are to be mapped to the layers of the precoding matrix according to an ordering of the set of DMRS antenna ports, and
wherein the one or more first layers are consecutive layers in the precoding matrix and the one or more second layers are consecutive layers in the precoding matrix.

13. The base station of claim 11, wherein the set of DMRS antenna ports are to be mapped first to the layers of the precoding matrix that are to be transmitted by the UE using the first transmission group, and second to the layers of the precoding matrix that are to be transmitted by the UE using the second transmission group.

14. The base station of claim 11, wherein the set of DMRS antenna ports are to be mapped to the layers of the precoding matrix according to an ordering of the set of DMRS antenna ports, and
wherein the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

15. The base station of claim 10, wherein the first association and the second association are based at least in part on information that identifies the first association and the second association.

16. The base station of claim 15, wherein the information is transmitted via radio resource control signaling.

17. The base station of claim 15, wherein the information identifies an association between a channel state information reference signal (CSI-RS) antenna port set, a transmission group, a CDM group, and at least one of a sounding reference signal (SRS) antenna port set, an SRS, or an SRS set.

18. The base station of claim 17, wherein the association is further with at least one of a quasi-co-location assumption or a transmission configuration indicator state.

19. A method of wireless communication performed by a user equipment (UE), comprising:
receiving downlink control information that indicates a transmit precoding matrix indicator, that identifies a precoding matrix, and a set of demodulation reference signal (DMRS) antenna ports, wherein:
a first association is between a first set of antenna indices of the precoding matrix, that form a first transmission group, and a first code-division multiplexing (CDM) group of the set of DMRS antenna ports,
a second association is between a second set of antenna indices of the precoding matrix, that form a second transmission group, and a second CDM group of the set of DMRS antenna ports, and
the first set of antenna indices is different than the second set of antenna indices and the first CDM group is different than the second CDM group; and
transmitting an uplink transmission according to the first association and the second association.

20. The method of claim 19, wherein the set of DMRS antenna ports are mapped to layers of the precoding matrix, and
wherein the first association and the second association are based at least in part on a determination that DMRS antenna ports of the first CDM group are mapped to one or more first layers that are to be transmitted using the first transmission group, and DMRS antenna ports of the second CDM group are mapped to one or more second layers that are to be transmitted using the second transmission group.

21. The method of claim 20, wherein the set of DMRS antenna ports are mapped to the layers of the precoding matrix according to an ordering of the set of DMRS antenna ports, and wherein the one or more first layers are consecutive layers in the precoding matrix and the one or more second layers are consecutive layers in the precoding matrix.

22. The method of claim 20, wherein the set of DMRS antenna ports are mapped first to the layers of the precoding matrix that are to be transmitted using the first transmission group, and second to the layers of the precoding matrix that are to be transmitted using the second transmission group.

23. The method of claim 20, wherein the set of DMRS antenna ports are mapped to the layers of the precoding matrix according to an ordering of the set of DMRS antenna ports, and
wherein the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

24. The method of claim 19, wherein the first association and the second association are based at least in part on information that identifies the first association and the second association.

25. A method of wireless communication performed by a base station, comprising:
transmitting downlink control information that indicates a transmit precoding matrix indicator, that identifies a precoding matrix, and a set of demodulation reference signal (DMRS) antenna ports, wherein:
a first association is between a first set of antenna indices of the precoding matrix, that form a first transmission group, and a first code-division multiplexing (CDM) group of the set of DMRS antenna ports,
a second association is between a second set of antenna indices of the precoding matrix, that form a second transmission group, and a second CDM group of the set of DMRS antenna ports, and
the first set of antenna indices is different than the second set of antenna indices and the first CDM group is different than the second CDM group; and
receiving an uplink transmission according to the first association and the second association.

26. The method of claim 25, wherein the set of DMRS antenna ports are to be mapped to layers of the precoding matrix, and
wherein the first association and the second association are based at least in part on DMRS antenna ports of the first CDM group being mapped to one or more first layers that are to be transmitted by a user equipment (UE) using the first transmission group, and DMRS antenna ports of the second CDM group being mapped to one or more second layers that are to be transmitted by the UE using the second transmission group.

27. The method of claim 26, wherein the set of DMRS antenna ports are to be mapped to the layers of the precoding matrix according to an ordering of the set of DMRS antenna ports, and
wherein the one or more first layers are consecutive layers in the precoding matrix and the one or more second layers are consecutive layers in the precoding matrix.

28. The method of claim 26, wherein the set of DMRS antenna ports are to be mapped first to the layers of the precoding matrix that are to be transmitted by the UE using the first transmission group, and second to the layers of the precoding matrix that are to be transmitted by the UE using the second transmission group.

29. The method of claim 26, wherein the set of DMRS antenna ports are to be mapped to the layers of the precoding matrix according to an ordering of the set of DMRS antenna ports, and
wherein the set of DMRS antenna ports are ordered such that DMRS antenna ports of the first CDM group are mapped to the layers of the precoding matrix that are to be transmitted using the first transmission group, and DMRS antenna ports of the second CDM group are mapped to the layers of the precoding matrix that are to be transmitted using the second transmission group.

30. The method of claim 25, wherein the first association and the second association are based at least in part on information that identifies the first association and the second association.

* * * * *